(12) United States Patent
Coleman et al.

(10) Patent No.: US 9,927,533 B2
(45) Date of Patent: Mar. 27, 2018

(54) INSTRUMENT FOR ASSAYING RADIATION

(71) Applicant: SAVANNAH RIVER NUCLEAR SOLUTIONS, LLC, Aiken, SC (US)

(72) Inventors: Jody Rustyn Coleman, Aiken, SC (US); Eduardo B. Farfan, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 1010 days.

(21) Appl. No.: 13/759,372

(22) Filed: Feb. 5, 2013

(65) Prior Publication Data

US 2014/0217301 A1 Aug. 7, 2014

(51) Int. Cl.
| | | |
|---|---|---|
| *G01T 1/00* | (2006.01) | |
| *G01T 1/169* | (2006.01) | |
| *G01K 1/02* | (2006.01) | |
| *G21K 1/04* | (2006.01) | |
| *G21K 1/02* | (2006.01) | |

(52) U.S. Cl.
CPC ............... *G01T 1/169* (2013.01); *G01K 1/02* (2013.01); *G21K 1/025* (2013.01); *G21K 1/04* (2013.01); *G21K 1/046* (2013.01)

(58) Field of Classification Search
CPC ............ G21K 1/02; G21K 1/025; G21K 1/04; G21K 1/046
USPC ................................. 250/336.1, 394
See application file for complete search history.

(56) References Cited

U.S. PATENT DOCUMENTS

| | | | | |
|---|---|---|---|---|
| 3,715,597 | A | * | 2/1973 | Hofmann .................. A61N 5/01 250/518.1 |
| 4,200,803 | A | * | 4/1980 | Becker et al. ................. 378/148 |
| 4,348,591 | A | * | 9/1982 | Wunderlich ................ 250/505.1 |
| 4,359,642 | A | * | 11/1982 | Heinz ....................... A61N 5/10 250/505.1 |
| 4,797,701 | A | * | 1/1989 | Lannes .......................... 396/322 |
| 5,866,914 | A | * | 2/1999 | Jones ........................ G21K 1/02 250/505.1 |
| 2012/0012749 | A1 | * | 1/2012 | Girones et al. ............ 250/336.1 |
| 2012/0043471 | A1 | | 2/2012 | Harpring et al. |
| 2012/0112099 | A1 | | 5/2012 | Coleman et al. |

\* cited by examiner

*Primary Examiner* — Kenneth J Malkowski
(74) *Attorney, Agent, or Firm* — Dority & Manning, P.A.

(57) ABSTRACT

An instrument for assaying radiation includes a radiation sensor and a collimator that covers at least a portion of the radiation sensor. The collimator defines a first field of view to the radiation sensor. An insert in the collimator defines a second field of view to the radiation sensor that is less than the first field of view.

18 Claims, 4 Drawing Sheets

INSTRUMENT FOR ASSAYING RADIATION

FEDERAL RESEARCH STATEMENT

This invention was made with Government support under Contract No. DE-AC09-08SR22470, awarded by the U.S. Department of Energy. The Government has certain rights in the invention.

FIELD OF THE INVENTION

The present invention generally involves an instrument for assaying radiation. In particular embodiments, a collimator, camera, and/or dosimeter may be incorporated into the instrument to enhance sensitivity and positioning of the instrument in the area being assayed.

BACKGROUND OF THE INVENTION

The use of radioactive material occasionally results in radiation and/or contamination areas that require decontamination or other remedial efforts. In some cases, the radiation and/or contamination levels may be significant, and the specific locations of the radiation and/or contamination may not be accurately known. As a result, various instruments have been developed to assay radiation and contamination areas so that the costs and personnel exposures associated with the decontamination or other remediation efforts can be reduced.

Various factors are considered in the design and selection of instruments to assay radiation and/or contamination areas. For example, the responsive range of the instruments should be selected so that the instruments are capable of reliably measuring varying levels of radiation without requiring excessive exposure times while also having sufficient sensitivity to discriminate between separate sources of radiation and/or locations of contamination. In addition, remote positioning and operation of the instruments is often desirable to reduce personnel exposure, particularly when the radiation and/or contamination levels are high or unknown. As a result, various improvements in instruments used to assay radiation and/or contamination areas that enhance sensitivity and/or remote positioning of the instruments would be useful.

BRIEF DESCRIPTION OF THE INVENTION

Aspects and advantages of the invention are set forth below in the following description, or may be obvious from the description, or may be learned through practice of the invention.

In one embodiment of the present invention, an instrument for assaying radiation includes a radiation sensor and a collimator that covers at least a portion of the radiation sensor. The collimator defines a first field of view to the radiation sensor. An insert in the collimator defines a second field of view to the radiation sensor that is less than the first field of view.

Another embodiment of the present invention is an instrument for assaying radiation that includes a plurality of radiation sensors and a separate collimator that covers at least a portion of each of the plurality of radiation sensors. Each collimator defines a first field of view. A separate insert in each collimator defines a second field of view that is less than the first field of view.

In yet another embodiment of the present invention, an instrument for assaying radiation may include a radiation sensor and means for collimating the radiation into the radiation sensor.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
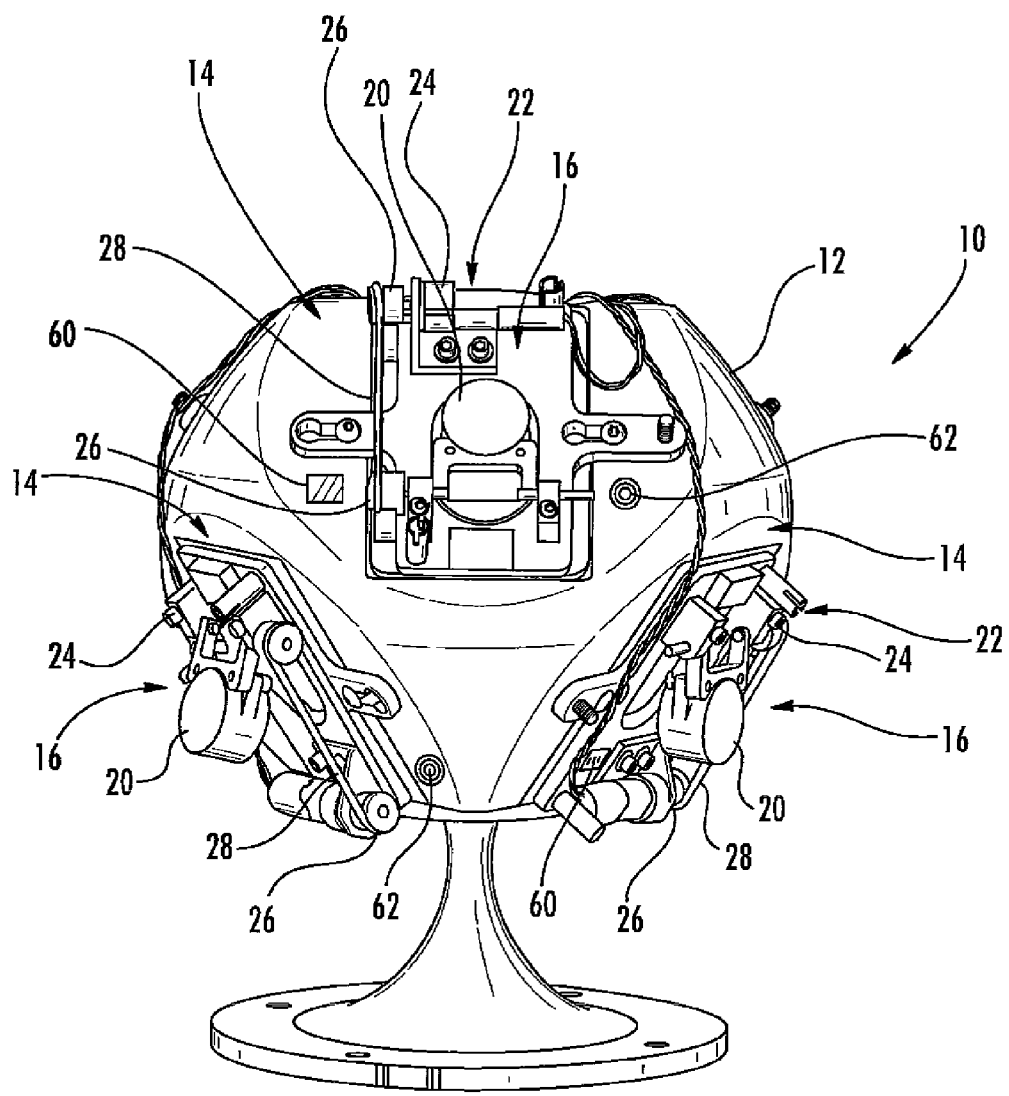
FIG. 1 is a perspective view of an instrument for assaying radiation according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream," "downstream," "radially," and "axially" refer to the relative direction with respect to particle movement. For example, "upstream" refers to the direction from which the particle flows, and "downstream" refers to the direction to which the particle flows. Similarly, "radially" refers to the relative direction substantially perpendicular to the particle flow, and "axially" refers to the relative direction substantially parallel to the particle flow.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include an instrument for assaying radiation. The instrument generally includes one or more radiation sensors, and a separate collimator covers at least a portion of each of the radiation sensors. Each collimator defines a first field of view, and an insert in the collimator defines a second field of view that is less than the first field of view. In particular embodiments, for example, the first field of view may be greater than 60 degrees, and the first field of views of the separate collimators may overlap one another. The insert may define a frustoconical shape and a through bore so that the second field of view may be less than or equal to 60 degrees. In this manner, the first fields of view of the collimators may provide panoramic coverage around the instrument, while the second fields of views of the inserts may enhance detection and discrimination of closely spaced radioactive sources.

Referring now to the drawings, wherein identical numerals indicate the same elements throughout the figures, FIG. 1 provides a perspective view of an instrument 10 for assaying radiation according to one embodiment of the present invention. The instrument 10 may include a housing 12 that defines one or more faces 14 with a radiation sensor 16 in each face 14. The housing 12 may be formed from shielding material such as tungsten or a tungsten alloy to reduce or prevent radiation from passing through the housing 12 and interacting with multiple radiation sensors 16, facilitating analysis of the radiation sensors 16 after exposure to radiation. For example, a tungsten layer having a thickness of approximately 1.5 cm will provide adequate shielding to sufficiently reduce or prevent radiation from passing through the housing 12 and interacting with the radiation sensors 16. If desired, the interior portion of the housing 12 may be made from aluminum or aluminum alloys. The aluminum and/or aluminum alloys provide sufficient shielding inside the housing 12 while also reducing the weight of the housing 12 to facilitate deployment and positioning of the instrument 10.

The instrument 10 may include a separate shutter 20 for each radiation sensor 16 to shield the radiation sensors 16 from exposure prior to being positioned for operation. Each shutter 20 may have a drive mechanism 22 to alternately open or close the shutter 20, and each drive mechanism 22 may be operated in concert or independently from the other drive mechanisms 22 to allow for different exposure times for each radiation sensor 16. The drive mechanism 22 may include any electrical, mechanical, electro-mechanical, servo-mechanical, or other mechanism known in the art for sliding, pivoting, rotating, or otherwise positioning the shutter 20. As shown in FIG. 1, for example, the exemplary drive mechanism 22 may include a motor 24 connected to the shutter 20 by one or more drive wheels 26 and a pulley 28 to pivot or retract the shutter away from the radiation sensor 16, thereby exposing the radiation sensor 16 to the radiation and/or contamination area. The motor 24 may be operated locally, remotely, or by a timing circuit, as desired, to reduce personnel exposure during operation of the instrument 10. In this manner, each shutter 20 may have a closed position to shield the associated radiation sensor 16 from exposure during transport and positioning of the instrument 10 and an open position once the instrument 10 is positioned and ready for operation.

The radiation sensors 16 may be recessed in the housing 12 to enhance the shielding provided by the housing 12, and the number and arrangement of the faces 12 and radiation sensors 16 may be selected to provide a desired coverage for the instrument 10. As shown in FIG. 1, for example, six faces 14 and six radiation sensors 16 may be arranged on the instrument 10 to provide continuous, overlapping coverage around the instrument 10. In this manner, a single instrument 10 may provide 4π steridian coverage in a radiation and/or contamination area.

Figure 2:
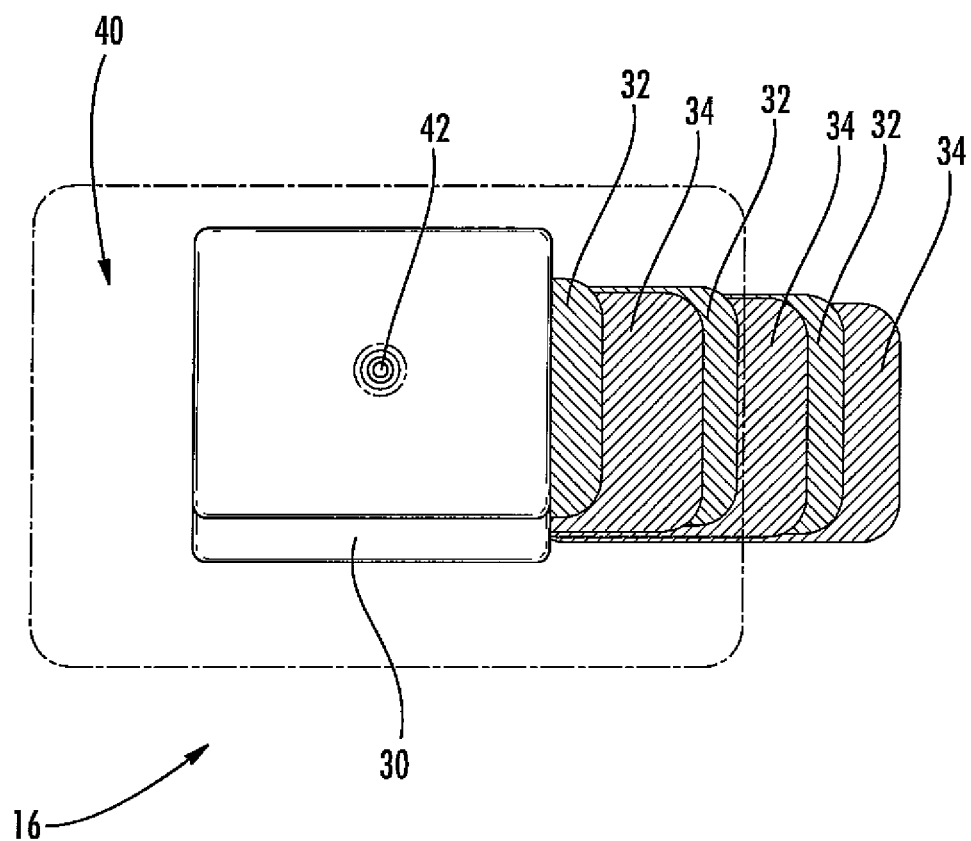
FIG. 2 is a perspective view of an exemplary radiation sensor and collimator shown in FIG. 1.

FIG. 2 provides a perspective view of the exemplary radiation sensor 16 shown in FIG. 1. As shown in FIG. 2, the radiation sensor 16 may include a casing 30 that holds one or more radiation sensitive film layers 32 sandwiched around attenuation layers 34. The casing 30 facilitates installation and removal of the film layers 32 and attenuation layers 34 from the housing 12 and may be made from tungsten, aluminum, aluminum alloys, or other material that may supplement the shielding provided to the radiation sensor 16.

The geometry, number, and thickness of the film layers 32 and attenuation layers 34 may be selected based on the anticipated source and/or energy level present in the radiation and/or contamination area. In particular embodiments, for example, the film layers 32 may include x-ray imaging photographic film used in conventional medical applications. Alternately or in addition, the film layers 32 may include Phosphorous Storage Plate (PSP) technology as described in U.S. Patent Publication 2012/0112099 and assigned to the same assignee as the present application, the entirety of which is incorporated herein for all purposes. The attenuation layers 34 are similarly selected to partially shield radiation that passes through the film layers 32. Suitable attenuation layers 34 may include, for example, metal, plastic, or glass, depending on the anticipated source and/or energy level present.

The attenuation layers 34 produce a different exposure for each film layer 32 exposed to radiation. For example, radiation exposed to the radiation sensor 16 will produce the largest exposure in the outermost film layer 32, with progressively decreasing exposures to each interior film layer 32, depending on the particular attenuation layer 34 between each film layer 32. The number of film layers 32 and attenuation coefficients for the attenuation layers 34 may be varied as desired to achieve a desired sensitivity to radiation and/or discrimination of different energy levels. After an exposure to radiation, the individual films layers 32 may be removed from the casing 30 for analysis, and the amount and/or energy level of the radiation present may be calculated based on the known attenuation layers 34 and different exposures received by each film layer 32.

The instrument 10 may further include means for collimating the radiation into the radiation sensor 16. The function of the means is to channel, focus, or narrow the radiation exposed to the film layers 32. As shown in FIG. 2, the structure for performing this function may include a collimator 40 (shown in phantom) that covers at least a portion of the radiation sensor 16. The collimator 40 may be constructed from shielding material with an aperture 42 to block radiation from reaching the film layers 32 except through the aperture 42.

Figure 3:
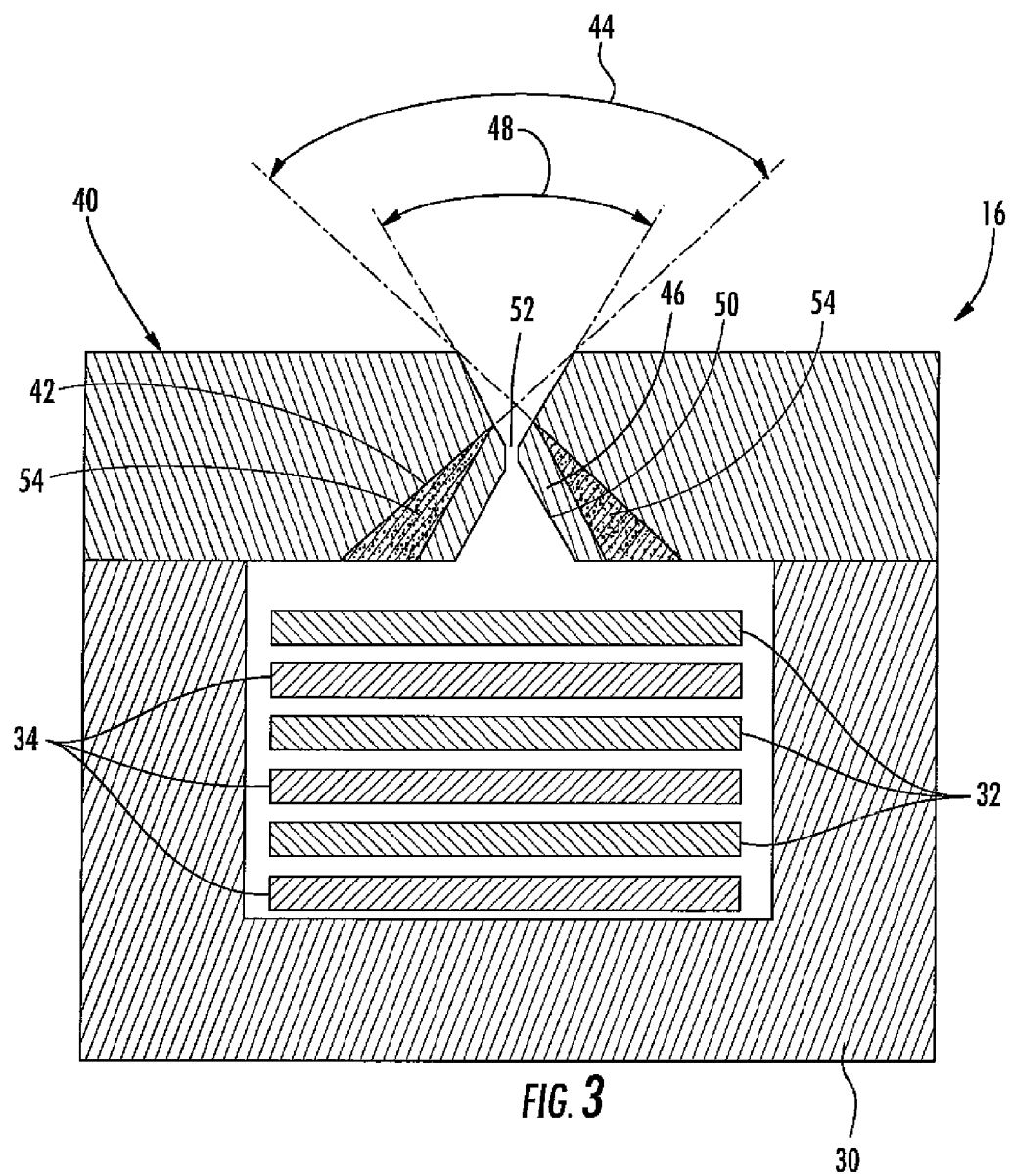
FIG. 3 is a cross-section view of the radiation sensor and collimator shown in FIG. 2.
Figure 4:
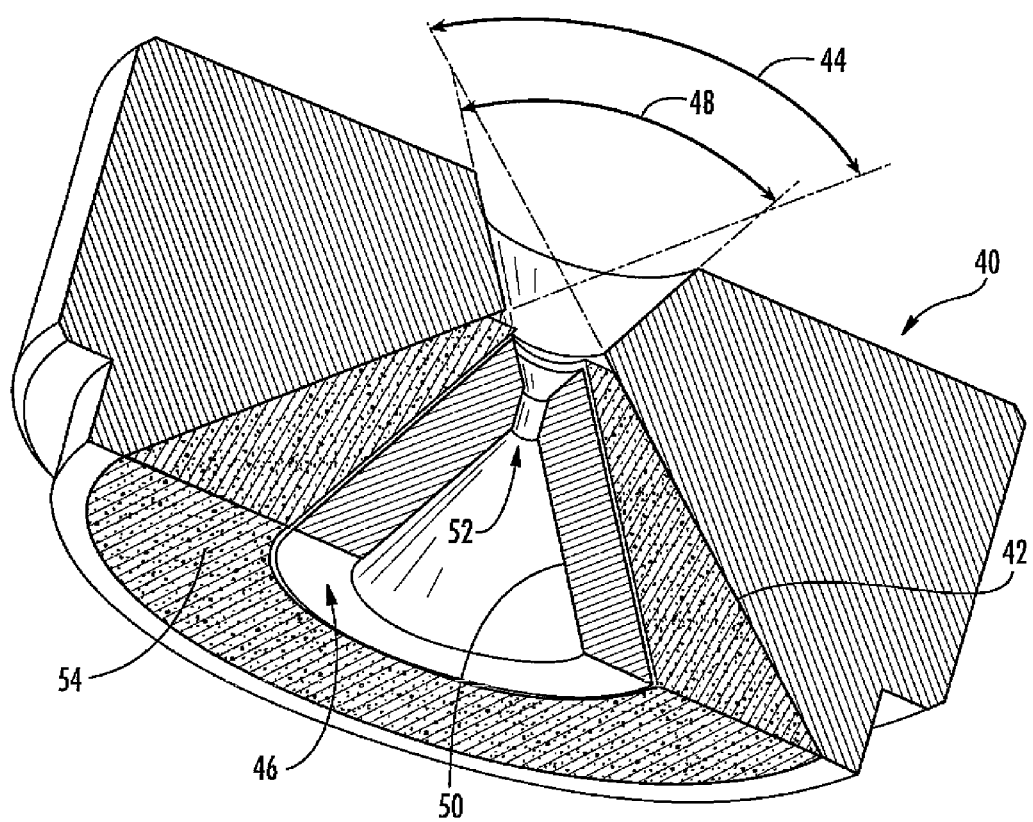
FIG. 4 is a perspective cross-section view of the collimator shown in FIG. 2.

FIG. 3 provides a cross-section view of the radiation sensor 16 and collimator 40 shown in FIG. 2, and FIG. 4 provides a perspective cross-section view of the collimator 40 shown in FIGS. 2 and 3. As shown most clearly in FIGS. 3 and 4, the collimator 40 defines a first field of view 44 to the radiation sensor 16. The first field of view 44 is created by the slope of the surface of the collimator 40 proximate to the aperture 42 and is defined as the angle between opposing surfaces of the collimator 40 proximate to the aperture 42. The size of the first field of view 44 may be selected based on the number of faces 14 and radiation sensors 16 on the instrument so that the first fields of view 44 of the collimators 40 overlap to provide panoramic coverage around the instrument 10. In the particular embodiment shown in FIGS. 1-4, the first field of view 44 is approximately 96 degrees so that the six radiation sensors 16 shown in FIG. 1 provide 360 degrees of sensitivity to radiation around the instrument 10. In other particular embodiments, the first field of view 44 may be between 60 and 120 degrees to provide the desired overlap between adjacent radiation sensors 16; however, the specific size of the first field of view 44 is not a limitation of the present invention unless specifically recited in the claims.

The means for collimating the radiation into the radiation sensor 16 may further include an insert 46 in the collimator 40 that defines a second field of view 48 to the radiation sensor 16 that is less than the first field of view 44. The size of the second field of view 48 may be selected based on the number of faces 14, the size of the first field of view 44, and/or the anticipated radiation sources present so that the insert 46 enhances discrimination between discrete radiation sources that are close to one another. In the particular embodiment shown in FIGS. 1-4, the second field of view 48 is approximately 60 degrees to focus the first field of view 44 of 96 degrees and enhance discrimination of gamma radiation having an energy level between approximately 0.6 MeV and 1.3 MeV. In other particular embodiments, the second field of view 48 may be less than 60 degrees to complement the first field of view 44 and/or enhance discrimination of radiation having different energy levels. The combination of the collimator 40 and insert 46 enables the means for collimating the radiation into the radiation sensor 16 to define the first field of view 44 to the radiation sensor 16 that is greater than 60 degrees and the second field of view 48 to the radiation sensor 16 that is less than or equal to 60 degrees.

The insert 46 may be constructed from shielding material to define a frustoconical inner shape 50 and a through bore 52, and the slope of the internal surface of the insert 46 proximate to the through bore 52 may define the second field of view 48. A material 54 transparent to radiation may be used to connect the insert 46 to the collimator 40 to hold the insert 46 in place. In this manner, the first and second fields of view 44, 48 define the paths that radiation may travel through the insert 46 and/or collimator 40 to reach the film layers 32, and the shielding provided by the insert 46 may block a portion of the radiation from passing through the collimator 40 to the film layers 32 to enhance discrimination of discrete radiation sources that are close to one another.

In particular embodiments, the instrument 10 may optionally include one or more dosimeters 60 and/or cameras 62 on the housing 12 aligned with the radiation sensors 16. Returning to FIG. 1, for example, a separate dosimeter 60 arid/or camera 62 may be mounted on each face 14 of the housing 12. The dosimeter(s) would enhance accurate placement of the instrument 10 in the radiation and/or contamination areas in situations in which existing surveys are either unavailable or unreliable. In addition, readings from the dosimeters 60 may be used to independently adjust the exposure time of each radiation sensor 16, allowing for more effective imaging of areas having substantially different radiation levels in different directions. Each camera 62 may include a wide-angle lens, supporting electronics, and a shared file storage media to record still and/or motion images during deployment of the instrument 10. The still and/or motion images may then be integrated and overlaid with the exposure information from the radiation sensors 16 to produce a composite image that visually correlates radiation levels to images of the radiation and/or contamination area.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An instrument for assaying radiation, comprising:
   a radiation sensor;
   a collimator covering at least a portion of the radiation sensor, wherein the collimator defines a first field of view to the radiation sensor; and
   an insert in the collimator, wherein the insert defines a frustoconical inner shape and a through bore to define a second field of view to the radiation sensor that is less than the first field of view, wherein the insert is located between the collimator and the radiation sensor.

2. The instrument as in claim 1, wherein the radiation sensor comprises an attenuation layer between a plurality of radiation sensitive film layers.

3. The instrument as in claim 1, wherein the first field of view is greater than 60 degrees.

4. The instrument as in claim 1, wherein the second field of view is less than or equal to 60 degrees.

5. The instrument as in claim 1, wherein the insert is connected to the collimator by a material that is transparent to radiation.

6. The instrument as in claim 1, further comprising a camera aligned with the radiation sensor.

7. The instrument as in claim 1, further comprising a dosimeter aligned with the radiation sensor.

8. An instrument for assaying radiation, comprising:
   a plurality of radiation sensors;
   a separate collimator covering at least a portion of each of the plurality of radiation sensors, wherein each collimator defines a first field of view; and
   a separate insert in each collimator, wherein each insert defines a frustoconical inner shape and a through bore to define a second field of view that is less than the first field of view, wherein each insert is located between each collimator and at least one of the radiation sensors.

9. The instrument as in claim 8, each radiation sensor comprises an attenuation layer between a plurality of radiation sensitive film layers.

10. The instrument as in claim 8, wherein the first field of view is greater than 60 degrees.

11. The instrument as in claim 8, wherein the second field of view is less than or equal to 60 degrees.

12. The instrument as in claim 8, wherein the first field of views of the separate collimators overlap one another.

13. The instrument as in claim 8, further comprising a camera aligned with at least one of the radiation sensors.

14. The instrument as in claim 8, further comprising a dosimeter aligned with at least one of the radiation sensors.

15. An instrument for assaying radiation, comprising:
    a radiation sensor; and
    means for collimating the radiation into the radiation sensor, wherein the means for collimating the radiation into the radiation sensor comprises a collimator covering at least a portion of the radiation sensor and an insert in the collimator, wherein the insert defines a frustoconical inner shape and a through bore and wherein the insert is located between the collimator and the radiation sensor.

16. The instrument as in claim 15, wherein the means for collimating the radiation into the radiation sensor defines a first field of view to the radiation sensor that is greater than 60 degrees.

17. The instrument as in claim 16, wherein the means for collimating the radiation into the radiation sensor defines a second field of view to the radiation sensor that is less than or equal to 60 degrees.

18. The instrument as in claim 15, further comprising at least one of a camera or a dosimeter aligned with the radiation sensor.

\* \* \* \* \*